United States Patent [19]

Funakoshi

[11] 4,075,295

[45] Feb. 21, 1978

[54] WATER FILM FORMING INSTALLATION

[76] Inventor: Eisuke Funakoshi, No. 1119-5, 1-chome, Hojo, Daito, Osaka, Japan

[21] Appl. No.: 693,472

[22] Filed: June 7, 1976

Related U.S. Application Data

[63] Continuation-in-part of Ser. No. 595,589, July 14, 1975, abandoned.

[30] Foreign Application Priority Data

Apr. 11, 1975 Japan .................................. 50-50660

[51] Int. Cl.² ........................................... B01D 47/00
[52] U.S. Cl. .................................... 261/36 R; 261/103
[58] Field of Search ..................... 261/36 R, 103, 106, 261/110

[56] References Cited

U.S. PATENT DOCUMENTS

| 684,217 | 10/1901 | Gardner et al. | 261/103 |
| 1,988,262 | 1/1935 | Burckhalter et al. | 261/110 |
| 2,054,541 | 9/1936 | Hettinger | 261/106 |
| 2,392,601 | 1/1946 | Long | 261/106 X |
| 2,795,288 | 6/1957 | Hirs | 261/106 X |
| 3,265,371 | 8/1966 | McGrath | 261/106 X |
| 3,284,068 | 11/1966 | Goettl | 261/106 X |
| 3,559,379 | 2/1971 | Lambert | 261/106 X |
| 3,738,621 | 6/1973 | Anderson | 261/106 X |

Primary Examiner—Frank W. Lutter
Assistant Examiner—William A. Cuchlinski, Jr.
Attorney, Agent, or Firm—George B. Oujevolk

[57] ABSTRACT

Water is flowed down a net stretched between an upper conduit and a lower conduit. The water caught in the lower conduit is lifted by a pump to the upper conduit to circulate it. As water flows down the net, a constant film of water is formed to keep out sound, dust, smoke, heat and the like.

1 Claim, 5 Drawing Figures

WATER FILM FORMING INSTALLATION

This is a continuation-in part of U.S. patent application Ser. No. 595,589, filed July 14, 1975, now abandoned.

The present invention relates to a water film forming installation which continually forms a film of water on the whole surface of a net vertically stretched between an upper water supply tube and a lower water catch tube by allowing water to flow down the net from the upper tube and raising thereto the water collected for circulation.

It is an object of the present invention to provide a water film forming installation which is extremely simple in construction and is inexpensive to manufacture.

It is a further object of the present invention to provide a water film forming installation which forms a film of water throughout the surface of a net, thereby having soundproof, dustproof, smokeproof and heat-insulating effects.

These and other objects, features and advantages of the present invention will become more apparent from the following description and the accompanying drawings, in which.

Figure 1:
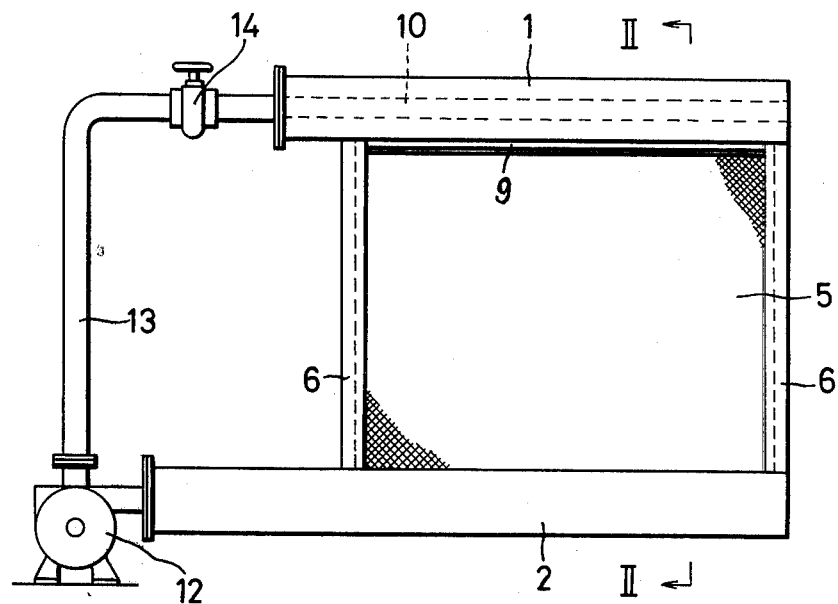
FIG. 1 is a front view of a water film forming installation according to the present invention.
Figure 2:
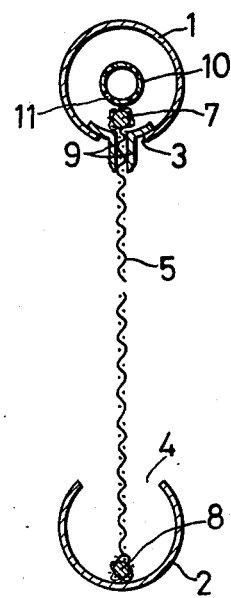
FIG. 2 is a cross-sectional view taken on line II—II of FIG. 1.

Referring to FIGS. 1 and 2, a water supply tube or conduit 1 is mounted horizontally above ground and a water catch tube or conduit 2 is mounted horizontally right under the upper tube 1 in vertical alignment therewith.

The upper supply tube 1 has an elongated opening 3 longitudinally formed in the bottom surface thereof and the lower catch tube 2 has an elongated opening 4 longitudinally formed in the top surface thereof. A sheet of net 5 of metal or synthetic resin is vertically stretched between the upper and lower tubes 1 and 2 with the upper and lower ends thereof passing through the elongated openings 3 and 4, respectively.

The net 5 has its both side ends secured to struts 6 which provide support between the upper tube 1 and the lower tube 2. It also has its upper and lower ends wound around, and secured to, rods 7 and 8, respectively, which are mounted in the upper and lower tubes 1 and 2, respectively.

The rods 7 and 8 may have their ends coupled by any suitable means to the upper and lower ends of the struts 6, respectively, for more secure stretching.

In the opening 3 in the upper tube 1 are fixedly mounted a pair of supporting plates 9 of V-shape section which are so spaced as to permit passage of the net 5 but not that of the rod 7. Thus, the rod 7 is supported on the supporting plates 9, but loosely enough to allow water to flow down.

Into the upper tube 1 is inserted a water supply pipe 10 which has plurality of holes 11 formed therein throughout the periphery thereof.

The lower tube 2 is connected to a pump 12 from which a water lifting pipe 13 rises and communicates with the water supply pipe 10 through a valve 14. The pump 12 and the pipe 13 constitute means for lifting water.

In operation, water is pumped up through the pipe 13 to the water supply pipe 10 by means of the pump 12. The water is uniformly spouted from the holes 11 in the pipe 10 onto the inner wall of the upper tube 1. It then flows through the elongated opening 3 down the net 5, forming a water film over a substantially whole surface of the net 5. The water is caught in the lower tube 2, sucked into the pump 12, and pumped up back to the upper tube 1 to form a water film again.

Although not illustrated in FIG. 1, a water replenisher pipe is connected to the pipe 13 to replenish fresh water and a filter is provided to remove dust which may have been trapped as water flows down the net 5. In the preferred embodiment, a net of 10- to 15-mesh Tyler is used, but a net of any other suitable mesh may be selected according to application. Also, two or more sheets of nets may be used in layers.

Figure 3:
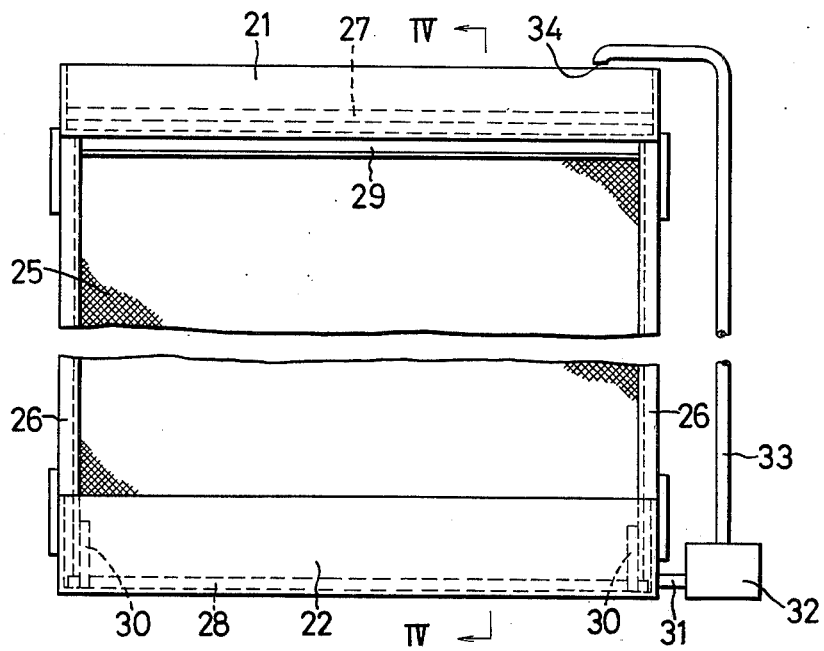
FIG. 3 is a partially cutaway front view of another embodiment of the present invention.
Figure 4:
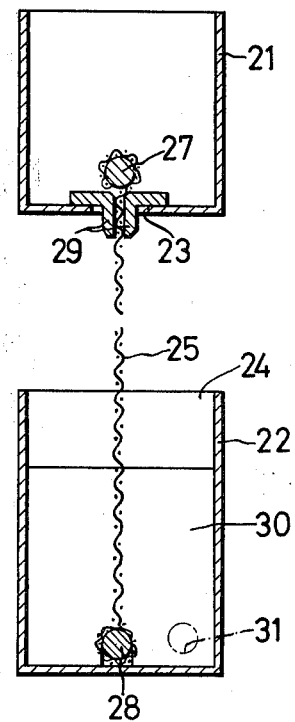
FIG. 4 is a cross-sectional view taken on line IV—IV of FIG. 3.

Next, referring to FIGS. 3 and 4 showing another embodiment of the present invention, upper and lower conduits 21 and 22 are in the shape of elongated boxes open at their top.

The upper conduit 21 has a longitudinal elongated opening 23 formed in the bottom thereof over the whole length thereof and is provided with a pair of supporting plates 29 secured inside the opening 23. The lower conduit 22 has a top opening 24.

The net 25 has its top and bottom ends wound around and secured to a rod 27 in the upper conduit 21 and a rod 28 in the lower conduit 22 in the same manner as in the first embodiment. The rod 27, which has a larger diameter than the distance between the supporting plates 29, is supported thereon. The rod 28 is supported by a pair of holding plates 30 which are secured to the end walls of the lower conduit 22.

The net is stretched between the rods 27 and 28 with its sides secured to struts 26 which support the upper conduit 21. In this embodiment, too, the net 25 can be more securely stretched by coupling the ends of the rods 27 and 28 to the upper and lower ends of the struts 26, respectively, by any suitable method.

A return pipe 31 is connected to a pump 32 from which a water lifting pipe 33 extends upward. The pump 32 and the pipe 33 constitute water lifting means. Water is supplied from a top end 34 of the pipe 33. Though not illustrated, a water replenisher pipe and a filter are provided.

In operation of the second embodiment, the pump 32 is operated to lift water through the pipe 33 to the upper conduit 21. Water flows down the net 25 through between the supporting plates 29, forming a film of water over the whole surface of the net 25. The water is gathered in the lower conduit 22 and sucked into the pump 32 for circulation.

Figure 5:
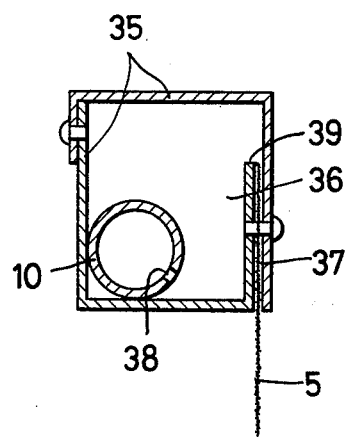
FIG. 5 shows another embodiment of the invention.

The attached FIG. 5 shows the third embodiment of this application, in which two U-shaped members 35 are bolted together to enclose the water supply tube 10 and form a water reservoir 36 therein and a slit 37 therebetween. The slit 37 is open at its lower end and communicates with the water reservoir 36 at its upper end. The water supply tube 10 is provided with a plurality of nozzles 38 formed therein to be spaced from one another. Water is jet out of the nozzles 38 toward the bottom plate and collects in the water reservoir 36.

When the water level rises above the upper end 39 of the end plate of one member, water overflows it, flowing down the slit and then the net 5 fastened by screws between the end plates of the U-shaped member 35. The rest is the same as in the first embodiment.

This arrangement assures that if only the upper end 39 of the end plate of the inner U-shaped member 35 is precisely levelled, a constant film of water is formed on the net over the entire width thereof to shut out air, dust, smoke, heat, etc. Water overflows quietly with no pressure applied.

In the embodiments of the present embodiments, the formation of a constant water film is assured by properly adjusting the water supply rate and the distances between the supporting plates 9 or 29, or the width of the slit 37.

I claim:

1. A water film forming installation wherein air is shut out by a constant film of water, comprising in combination:
   a. a first water supply conduit (10) having a plurality of nozzles (38) therein spaced from each other;
   b. first and second enclosing members (35) with vertical side plates, the first member with a U-shape cross-section the second member with an inverted U-shape cross-section, one of the vertical side plates on each member being the taller side plate and substantially the same height as the corresponding one side plate on the other member, the other side plate on each member being of shorter height, the shorter heighth side plate on the first member being taller than the corresponding shorter heighth side plate on the second member, the first member being juxtapositioned under the second member, so that the side plates of the second member outwardly cover the side plates of the first member and the shorter side plate of the first member is disposed alongside and bolted to the taller side plate of the second member so that a slit (37) is formed between plates by said shorter side plate of the first member and the taller side plate of the second member said members defining a rectangular box-like reservoir (36) with lower corners, one corner being alongside said slit, the water supply conduit (10) being disposed in the other lower corner, opposite said slit (37), so that water supplied by said nozzles (38) fill up said reservoir (36) until the water level rises above said slit and overflows it flowing down the slit;
   c. a second water supply conduit (22) horizontally mounted right under said box-like reservoir, said second conduit (22) having an elongated opening (4), which is disposed under said box-like reservoir so as to catch said overflow;
   d. a vertical net of ten to fifteen mesh Tyler stretched between said first second conduit and passing in the slit to the top of the slit so that the water overflowing said slit moves vertically down over the net shutting out the passage of air through the net; and,
   e. means for raising the water collected in said second conduit back to said first conduit.

* * * * *